(12) United States Patent
Donga (10) Patent No.: US 12,106,287 B2
(45) Date of Patent: *Oct. 1, 2024

(54) ON-DEMAND PAYMENT GENERATION TRANSACTION SYSTEMS

(71) Applicant: PayPal, Inc., San Jose, CA (US)

(72) Inventor: Bhargavkumar Donga, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 1054 days.

This patent is subject to a terminal disclaimer.

(21) Appl. No.: 16/990,426

(22) Filed: Aug. 11, 2020

(65) Prior Publication Data

US 2021/0027284 A1    Jan. 28, 2021

Related U.S. Application Data (63) Continuation of application No. 15/146,858, filed on May 4, 2016, now Pat. No. 10,740,750.

(51) Int. Cl.
*G06Q 20/36* (2012.01)
*G06Q 20/10* (2012.01)
*G06Q 20/34* (2012.01)
*G06Q 20/40* (2012.01)

(52) U.S. Cl.
CPC ......... *G06Q 20/3674* (2013.01); *G06Q 20/10* (2013.01); *G06Q 20/342* (2013.01); *G06Q 20/3552* (2013.01); *G06Q 20/4018* (2013.01)

(58) Field of Classification Search
None
See application file for complete search history.

(56) References Cited

U.S. PATENT DOCUMENTS

| | | |
|---|---|---|
| 7,752,095 B1 | 7/2010 | Laracey |
| 8,321,285 B1 | 11/2012 | Hurst |
| 8,380,177 B2 | 2/2013 | Laracey |
| 8,538,845 B2 | 9/2013 | Liberty |
| 8,632,000 B2 | 1/2014 | Laracey |
| 9,208,482 B2 | 12/2015 | Laracey |
| 9,305,295 B2 | 4/2016 | Laracey |
| 9,400,978 B2 | 7/2016 | Laracey |
| 11,599,885 B1* | 3/2023 | Allen ............... G06Q 20/4018 |
| 2003/0126064 A1 | 7/2003 | Foran |

(Continued)

OTHER PUBLICATIONS

Ben Woolsey, Mar. 22, 2006, "What are the Pros and Cons of Prepaid Debit Cards".

(Continued)

*Primary Examiner* — Jamie R Kucab
(74) *Attorney, Agent, or Firm* — Haynes and Boone, LLP (57) ABSTRACT

Methods and systems for generating on-demand payment instruments are described. A user with a user payment account may perform a transaction with a user device and request an on-demand payment instrument. The request may be communicated to a transaction device. The transaction device may authenticate the request and associate an on-demand payment instrument to the user payment account. Information associated with the on-demand payment instrument information may then be tokenized and communicated to the user device, the merchant, or another party and the information may be entered and/or processed for the transaction.

20 Claims, 6 Drawing Sheets

(56) References Cited

U.S. PATENT DOCUMENTS

| | | | |
|---|---|---|---|
| 2009/0063312 A1* | 3/2009 | Hurst | G06Q 20/40 |
| | | | 705/41 |
| 2010/0250410 A1 | 9/2010 | Song | |
| 2012/0330845 A1 | 12/2012 | Kang | |
| 2013/0246203 A1 | 9/2013 | Laracey | |
| 2017/0091764 A1 | 3/2017 | Lloyd | |

OTHER PUBLICATIONS

EMVco, Mar. 2014, "EMVco Payment Tokenisation Specification—Technical Framework—Version 1.0".

* cited by examiner

ON-DEMAND PAYMENT GENERATION TRANSACTION SYSTEMS

CROSS REFERENCED TO RELATED APPLICATIONS

This application is a continuation of U.S. patent application Ser. No. 15/146,858, filed on May 4, 2016, which issued as U.S. Pat. No. 10,740,750 on Aug. 11, 2020, the contents of which are incorporated herein by reference in its entirety.

BACKGROUND

Field of the Invention

The present invention generally relates to tokenized transactions, and more particularly to on-demand payment instrument generating transaction systems.

Related Art

Online electronic transactions are often conducted with electronic payment accounts. As online transactions continue to increase in popularity, electronic payment accounts may become the primary technique of payment. However, certain websites may continue to require a credit card or other non-electronic payment account.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods that generate on-demand payment instruments. The present disclosure describes some embodiments where a transaction device may receive a request for an on-demand transaction system from a user device from a user payment account, authenticate the user device, the user payment account, and/or the user, associating an on-demand payment account with the user payment account, and generating a token including information associated with the on-demand payment account. It is understood that though certain embodiments may be described as being performed with one or a plurality of techniques and/or devices, such description is illustrative and is not limiting.

In certain embodiments, a transaction device may be described. The transaction device may be in communication with a user device. The user device may be, for example, a computer such as a desktop or laptop computer, a tablet, a smart phone, a personal data assistant, a smartwatch, a wearable computing device, a virtual reality device, a smart television, or another such electronic device. A user of the user device may conduct a transaction and request an on-demand payment instrument. In certain examples, the on-demand payment instrument may be requested for a transaction with an online merchant not accepting an electronic payment method such as PAYPAL® payment accounts. The transaction device may receive the request for the on-demand payment instrument and authenticate the user or a user payment account associated with the user. After the user or the user payment account has been authenticated, the transaction device may generate and/or select an on-demand payment account. The transaction device may then associate the on-demand payment account with the user payment account. For example, the transaction device may note that the on-demand payment account has been requested and assigned to the user payment account. The transaction device may then tokenize information relating to the on-demand payment account and transmit the token to the user device.

After the user device has received the token, it may identify the on-demand payment account information and provide the on-demand payment information to the merchant and/or communicate information relating to the on-demand payment information with the user device. The transaction may then be conducted with the on-demand payment information. The transaction device may receive information from conducting the transaction. The information may be analyzed by the transaction device and the validity of the transaction may be determined from the information.

Figure 1:
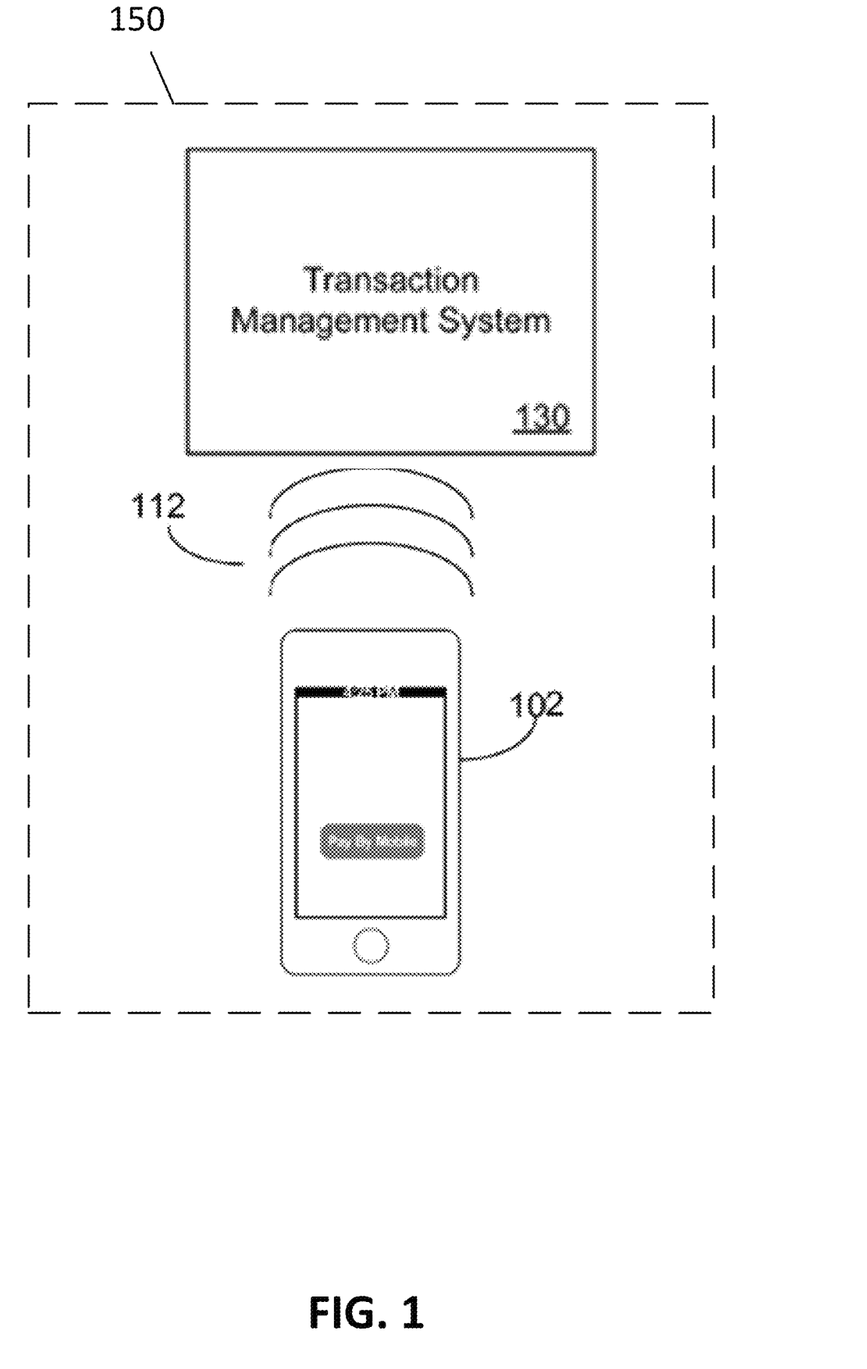
FIG. 1 is a block diagram showing a payment system according to an embodiment of the disclosure.

The present invention may be performed with certain payment systems. FIG. 1 is a block diagram showing a transaction system according to an embodiment of the disclosure. FIG. 1 includes a user device 102 and a transaction management system 130. The user device 102 may be connected to the transaction management system 130 via a communication path 112.

A user payment account holder (the "user") may have, use, or operate the user device 102. The user device 102 may be, for example, a smartphone, a personal data assistant, a tablet, a wearable electronic device (such as a smartwatch or electronically augmented glasses), a laptop computer, a desktop computer, or other electronic device. The user device 102 may include a user interface that includes a combination of one or more of a display screen, a data entry device such as a keypad or touch screen, buttons, facial or movement recognition abilities, audio sensors, movement sensors, speakers, indicator lights, or other items allowing a user to interact and/or receive signals from the user device 102. The user may use the user device 102 to conduct a transaction with a merchant. The merchant may also be in communication with the user device 102 via, for example, an internet, BLUETOOTH®, WiFi, broadband, 3G, 4G, 5G, Near Field Communication, or other communication standard connection. In certain embodiments, the merchant may be separate from the transaction management system 130, but other embodiments may house at least a portion of data used by the merchant within the transaction management system 130.

The transaction management system 130 may include one or more servers that may, for example, include a hard drive or other storage device that may store data associated with the account holders. Such data may be, for example, account identifiers or account numbers, user information such as name, contact information (e.g., phone numbers, e-mails, social media accounts, messaging service accounts, or other contact information), contact preferences, account information (e.g., bank account information, balance information, credit card numbers, expiration dates, or PIN numbers), and account balance, information on the location of the user (such as where the user has been), and other information associated with the account holder. The transaction management system 130 may process transactions carried out by the user device 102 or aid in such transactions by, for example, confirming payment associated with the transaction and transferring funds from the user's account to that of the merchant's account or by providing a payment instrument for conducting such transactions.

In some embodiments, the user device 102 and the merchant and/or the transaction management system 130 may be direct or indirect communication. Direct communication may be communication where the merchant user device is directly in contact with one or more servers of the transaction management system 130. Indirect communication may be communication where the user device 102 is in communication with one or more servers of the transaction management system 130 via one or more intermediaries such as merchant processors or gateway providers.

In certain embodiments, the user may conduct transactions, at least in part, through the use of a web browser on the user device 102. The web browser may allow for plug-ins and other add-ons. In certain embodiments, the add-ons may allow a user to request an on-demand payment instrument by interacting with the plug-in and/or add-on. The request for the on-demand payment instrument may then be communicated to the transaction management system 130. The transaction management system may then associate an on-demand payment account with the user account, tokenize the on-demand payment account, and communicate the on-demand payment account to the user device 102. After receiving the token, the user device 102 may then conduct the transaction with the on-demand payment account communicated from the transaction management system 130.

Figure 2:
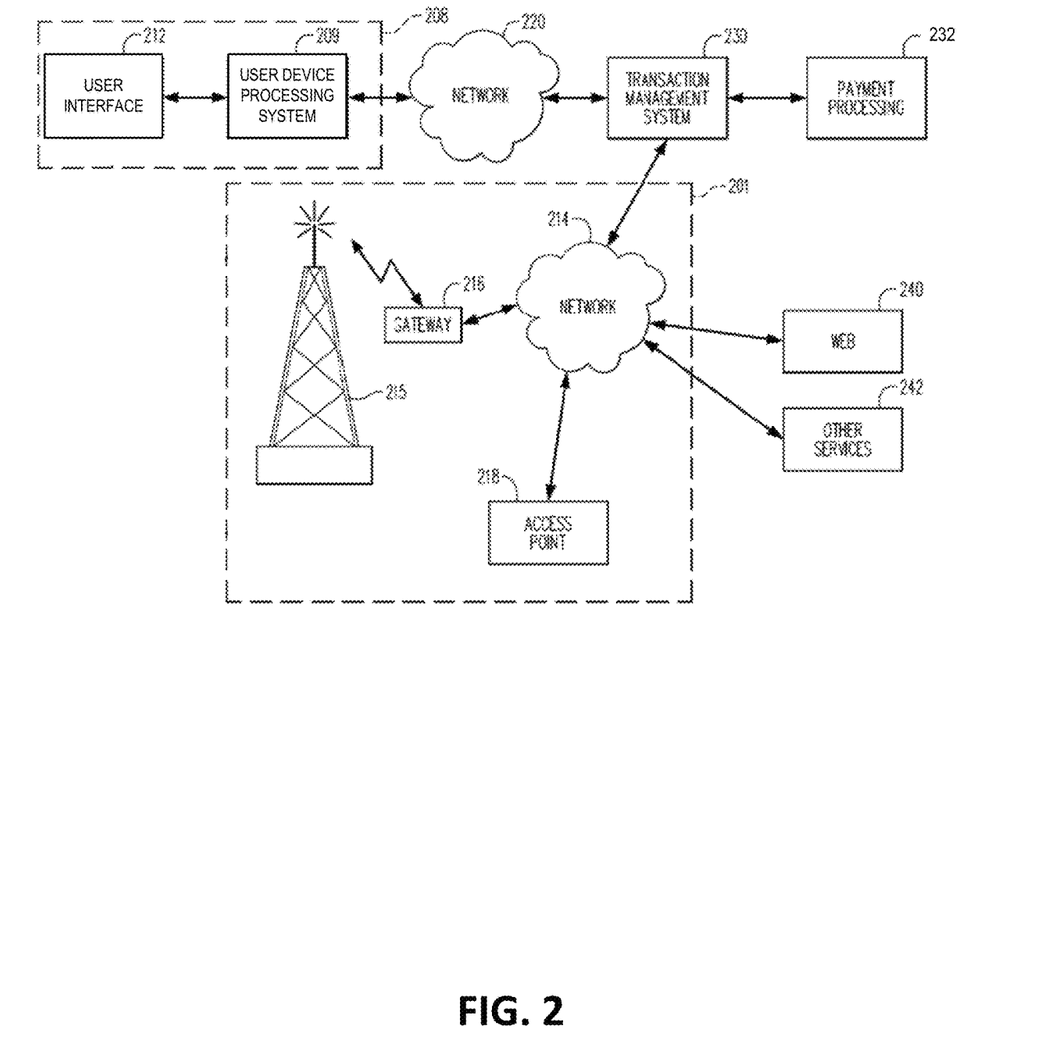
FIG. 2 is a block diagram showing further details of a payment system according to an embodiment of the disclosure.

Further details of the present invention may be described with reference to FIG. 2. FIG. 2 is a block diagram showing further details of a transaction system according to an embodiment of the disclosure. The payment system of FIG. 2 includes a user device 208, a transaction management system 230, and payment processing systems 232. The user device 208 may be similar to the user device 102 of FIG. 1. Pursuant to some embodiments, user device 208 may operate a web browser with an extension, add-on, and/or plug-in that is configured to request an on-demand payment instrument.

The user device 208 may be configured to communicate over one or more wired and/or wireless network 220. Examples of network 220 may include a wireless network such as a cellular network (represented by a cell transmitter 215). A user device 208 may communicate over a cellular or other wireless network and through a gateway 216 and then communicate with a network 214 (e.g., such as the Internet or other public or private network). An access point, such as access point 218 may be provided to facilitate data and other communication access to network 214. Access point 218 may be, for example, compliant with the 802.11g, BLUETOOTH® (or other) communication standards.

User device 208 may include a user interface 212 (such as a keypad or touch screen, or voice interface). Inputs from the user received via the user interface 212 may be processed by the user device processing system 209 and, possibly, communicated to other devices via the network 220. Pursuant to embodiments of the present invention, the customer may use the user device 208 to conduct a purchase transaction with a merchant. The user device 208 may communicated with the merchant and various data associated with the transaction may be communicated over the network 220. In certain embodiments, the user device 208 may transmit a token during initiation and/or processing of the transaction. For example, data associated with the transaction may be communicated via wired technologies such as broadband internet or wireless technologies such as NFC, BLUETOOTH®, BLUETOOTH® LOW ENERGY, Wi-Fi, or audio.

The merchant may be an Internet or other electronic commerce merchant. The merchant may be, for example, an internet merchant that is a part of web 240 located on a Web server (or a network of servers, some of which may be Internet accessible) configured to process purchase transactions associated with user device 208.

Figure 3:
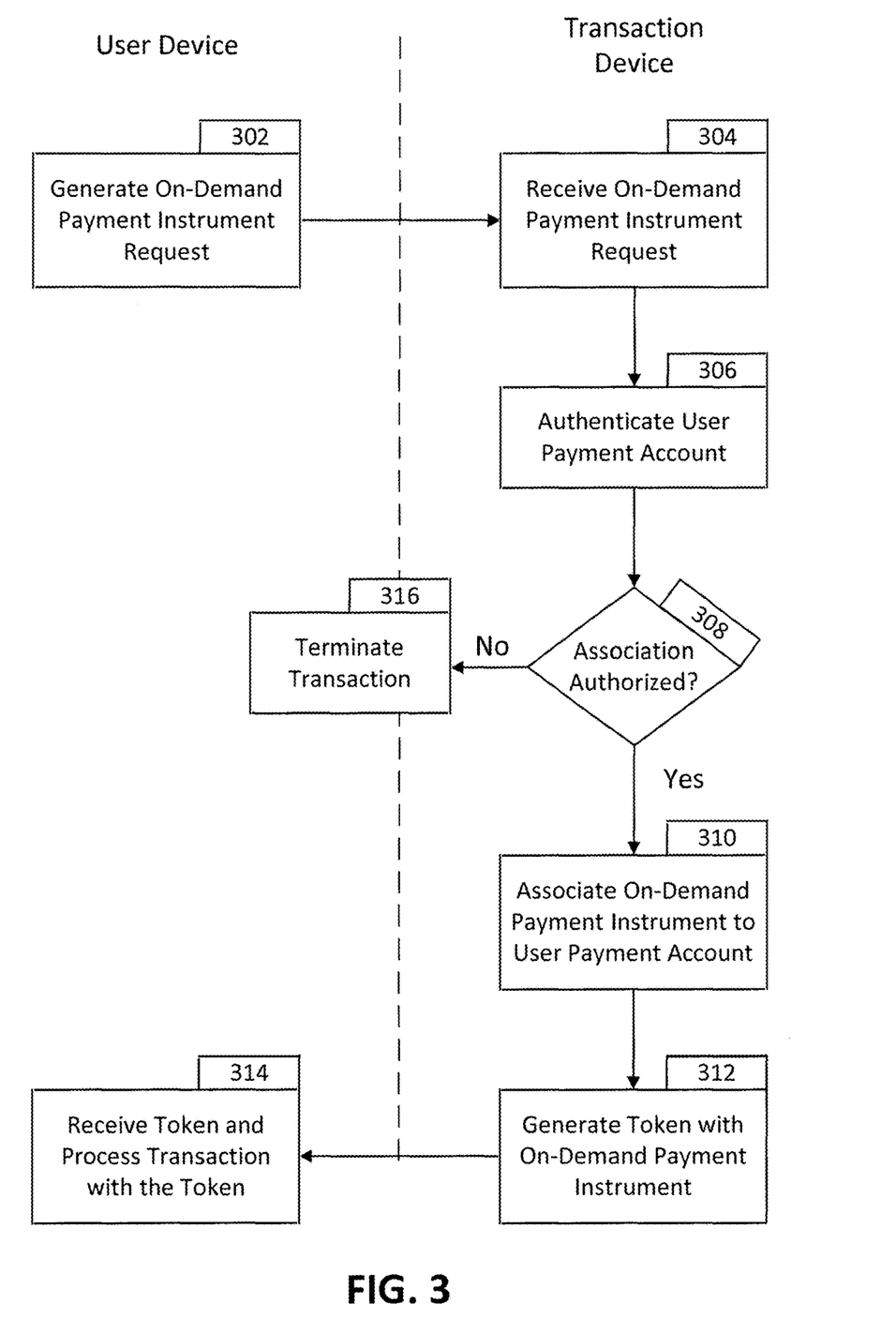
FIG. 3 is a flowchart showing on-demand payment instrument generation according to an embodiment of the disclosure.

On-demand payment generation may be further described in FIG. 3. FIG. 3 is a flowchart showing on-demand payment instrument generation according to an embodiment of the disclosure. The flowchart of FIG. 3, as well as FIG. 4, divides the processes performed into user device processes and transaction device processes. The user device may be, for example, the user device 102 or 208 of FIGS. 1 and 2. The transaction device may be, for example, the transaction management system 130 or 230 of FIGS. 1 and 2. It is appreciated that various embodiments may perform certain processes with a different component than that described herein. Thus, a process described as being performed by the user device may be performed, in certain embodiments, by the transaction device or vice versa.

In block 302, the user device may generate an on-demand payment instrument request. The user device may, in certain examples, include an extension, plug-in, or other input for a user to interact with to request the generation of the on-demand payment instrument. In certain embodiments, such an input may be installed on a web browser (e.g., SAFARI®, INTERNET EXPLORER®, GOOGLE CHROME®, MOZILLA FIREFOX®, and other such internet browsers). As such, for example, the web browser may include an extension and/or plug-in that may generate a request for the on-demand payment instrument. The request may be communicated through wired or wireless internet communications. Certain request may include an amount (e.g., a credit limit and/or a payment amount for the on-demand payment instrument) though other such requests may be open ended (as such, if the user has an account balance higher than a certain threshold balance or a credit rating higher than a threshold credit rating, such an open ended request may allowed and/or approved). Certain requests may include a time period or expiration point for the on-demand payment instrument. Additionally, the request may identify the transaction, the merchant, the transaction amount, and/or other such information. For example, the request may identify that the transaction is a recurring subscription payment of $29.99 per month to CrazyGoodTelecom and that the on-demand payment instrument is sought to pay for the first six months of the subscription. As such, the request may be for an on-demand payment instrument of $179.94 or more for a period of at least six months to be associated with the transaction with CrazyGoodTelecom. In certain embodiments, the on-demand payment instrument request may include information directed towards the identity of the user and/or the user identity of the user payment. In certain such embodiments, the extension, plug-in, or other input may require the user to log-in or otherwise authenticate his or her identity before the on-demand payment instrument request is generated. In other embodiments, the user may continue to be logged into the extension, plug-in, or other such input after an initial authentication and/or log-in process and may, thus, request the on-demand payment instrument at any time that he or she is logged in.

In block 304, the on-demand payment instrument request may be received by the transaction device. After the request has been received, the user payment account may be authenticated in block 306. Authenticating the user payment account may include, for example, determining an identity or log-in of the user and/or user payment account. In certain embodiments, authenticating the user payment account may include determining whether the user payment account is authorized to request an on-demand payment instrument. For example, for a certain payment service such as PAYPAL® payment services, there may be a requirement that only users that have a PAYPAL® account, or have a certain balance above a minimum threshold amount are eligible for on-demand payment instruments.

In block 308, the transaction device may determine if the user payment account may be authorized to be associated with an on-demand payment instrument. Authorization may be based on one or more of the balance of the user payment account, credit history of the user, transaction history of the user, merchant identity, amount requested, time period requested, and other considerations.

In various examples, the transaction device may, for example, compare the amount requested to the balance of the user payment account. In certain embodiments, the transaction device may authorize associating the user payment account to an on-demand payment instrument if the amount requested is lower than the balance of the user payment account. Other embodiments may authorize associating the on-demand payment instrument if the credit history of the user is above a certain threshold (e.g., above a certain credit score), if the merchant is an approved merchant, if the time period requested is below a certain maximum time period, if the transaction matches a transaction profile of the user (e.g., if the transaction is not indicative of fraud due to the transaction history of the user), or other such considerations.

In certain embodiments, the on-demand payment instrument may be, for example, a credit card that the user may temporarily use for the transaction or for a certain period of time. For such embodiments, the on-demand payment instrument may include a credit card number, an expiration date, a security code, an account name, and/or billing address information. In certain such embodiments, the credit card may be a pre-existing credit card temporarily assigned to the user or the user payment account or may be a credit card generated specifically for use by the user or the user payment account. Certain such embodiments may, for example, have the account name of the on-demand payment instrument be in the name of the user or the owner of the user payment account and may, additionally or alternatively, also match the billing address to the user or the owner of the user payment account. In other embodiments, the on-demand payment instrument may be another form of a payment card, a temporary online payment account, or another payment instrument. In certain embodiments, the on-demand payment instrument may include a credit limit or payment limit matching that of an amount requested or the value of the transaction, though other embodiments may include a limit higher than the amount requested or the value of the transaction. Additionally, usage of the on-demand payment instrument may be limited to the merchant and/or transaction identified during the request for the on-demand payment instrument. As such, a unique merchant and/or transaction ID may be included within the information associated with the on-demand payment instrument and the transaction may only be processed if the merchant and/or transaction matches such an ID (e.g., is confirmed to be the same merchant and/or transaction as that identified during the on-demand payment instrument request).

If the association is not authorized in block 308 (e.g., due to the user payment account not meeting conditions required for the authorization of being associated with the on-demand payment instrument), the process may continue to block 316 and terminate the transaction. If the association is authorized in block 308, the process may continue to block 310.

In block 310, the user payment account may be associated with the on-demand payment instrument. Associating the user payment account to the on-demand payment instrument may include, for example, noting that the on-demand payment instrument is assigned to the user payment account in a database of the transaction device, generating the on-demand payment instrument specifically for the user payment account, generating or assigning a stored value payment card for the user payment account, or otherwise preparing an instrument that may serve as a payment instrument for the user payment account. In certain embodiments, the on-demand payment instrument may be associated with only one user payment account at any one time. Other embodiments may associate multiple user payment accounts to any one on-demand payment instrument. Such embodiments may reduce the number of on-demand payment instruments generated and/or held by the on-demand payment instrument provider. Such embodiments may, additionally, include fraud detection software to match the various uses of the on-demand payment instrument to the user payment accounts that it is assigned to (e.g., if the on-demand payment instrument is assigned to a first party for a transaction of $30 and a second party for a transaction of $50, if a transaction of $30 is charged to the on-demand payment instrument, the details of the transaction may then be matched with the transaction details provided by the first party in order to authenticate that the transaction is indeed the transaction of the first party).

In block 312, a token may be generated that may include information associated with the on-demand payment instrument. For example, the token may include an account number (e.g., credit card or payment card number), an expiration date, an account name, a billing address, a security code, and other such information. In certain embodiments, the token may be of the format that may be sent to the user device for communication to the user. For example, information within the token may be communicated through visual (e.g., display), audio (e.g., through output of information via speakers), or through other such techniques. In such embodiments, the user may then manually enter the on-demand payment instrument information into, for example, the payment portion of a website. In other embodiments, the token may be configured to be received by the user device and/or the web browser of the user device and may auto-populate the payment portion of the website that a transaction is being conducted through. For example, the on-demand payment instrument request may include information directed towards the merchant of the transaction as well as information required by the merchant. The token may then be configured to auto-populate the website of the merchant or only the website of the merchant, and may include information needed by the web site to process payment (e.g., if a first website requires a security code, but a second website doesn't, and the transaction is being conducted via the second website, the token may not include security code information). After the token including the on-demand payment instrument information has been generated, it may be communicated to the user device. The token may be communicated via wired and/or wireless communication techniques, such as through the internet and then communicated via WiFi.

In block 314, the token may be received by the user device. The user device may then process the token. For example, the user device may display information associated with the on-demand payment instrument so that the user may enter the information into a website and/or may be received and processed by the user device to autofill portions of the website that may receive information related to the payment instrument. In certain other embodiments, the transaction device may, additionally or alternatively, communicate the token to the merchant or a party associated with the merchant (e.g., a payment account or a party processing payments for the merchant). In such examples, the on-demand payment instrument may be processed directly by the merchant or the party associated with the merchant. For example, the merchant or the party associated with the merchant may directly charge the on-demand payment instrument.

Figure 4:
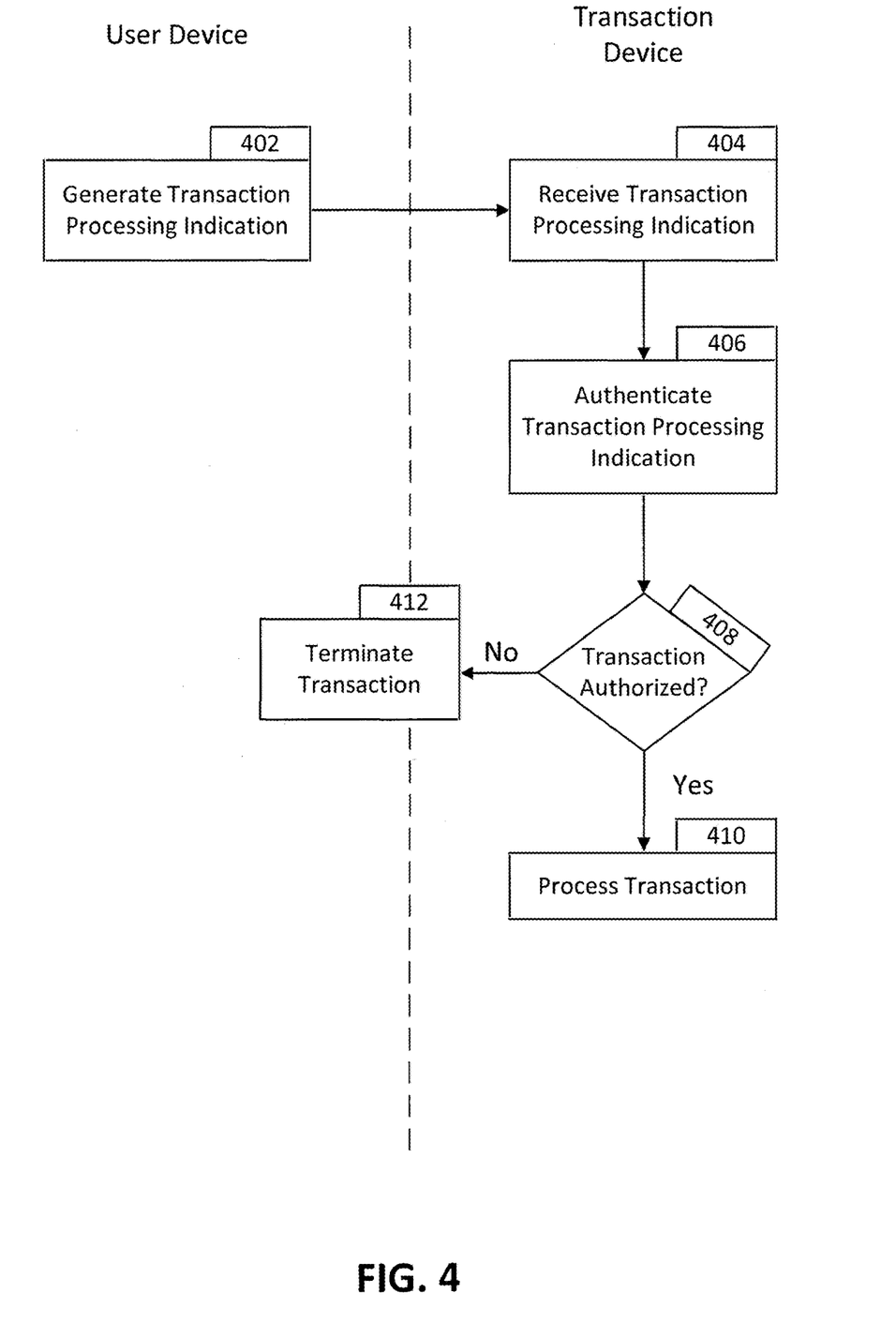
FIG. 4 is a flowchart showing a transaction processed with an on-demand payment instrument according to an embodiment of the disclosure.

FIG. 4 is a flowchart showing a transaction processed with an on-demand payment instrument according to an embodiment of the disclosure. FIG. 4 may be an example of a transaction conducted after a token including information associated with the on-demand payment instrument has been communicated.

In block 402, a transaction processing indication may be generated by the user device. The transaction processing indication may, for example, include information associated with the on-demand payment instrument information. In certain embodiments, the information associated with the on-demand payment instrument information may be communicated to the transaction device from the user device. In other embodiments, the merchant and/or a party associated with the merchant (e.g., a payment or payment receiving service) may communicate the transaction processing indication to the transaction device.

In certain embodiments, the transaction processing indication may include additional information such as, for example, the identity of the user, the identity of the user payment, the identity of the merchant, the transaction amount, the items, services, or other such good paid for in the transaction, the length of the payment (e.g., one-time, recurring, multiple instances), the shipping address, the billing address, and other such information.

In block 404, the transaction device may receive the transaction processing indication. The transaction device may then authenticate the transaction processing indication in block 406. The transaction processing indication may be authenticated by, for example, comparing information of the transaction processing indication to information within the on-demand payment instrument request. For example, the identity of the merchant, the transaction amount requested to the actual transaction amount, the shipping address to a stored address of the user, the length of the payment, the billing address, the items, services, or other goods purchased, rented, or subscribed to, and other such information may be compared. If such information matches, the transaction may be authorized in block 408. If such information does not match, the transaction may not be authorized. Certain embodiments may require the matching of a plurality of such information before the transaction is authorized. Additionally, if there is a discrepancy, the user may be contacted via a stored user contact associated with the user payment account.

If the transaction is authorized, the process may continue to block 410 and the transaction may be processed. As such, the on-demand payment instrument may be charged the transaction amount or a recurring payment may be scheduled for the on-demand payment instrument (e.g., according to the payment schedule). If the transaction is not authorized, the process may continue to block 412 and the transaction may be terminated.

Figure 5:
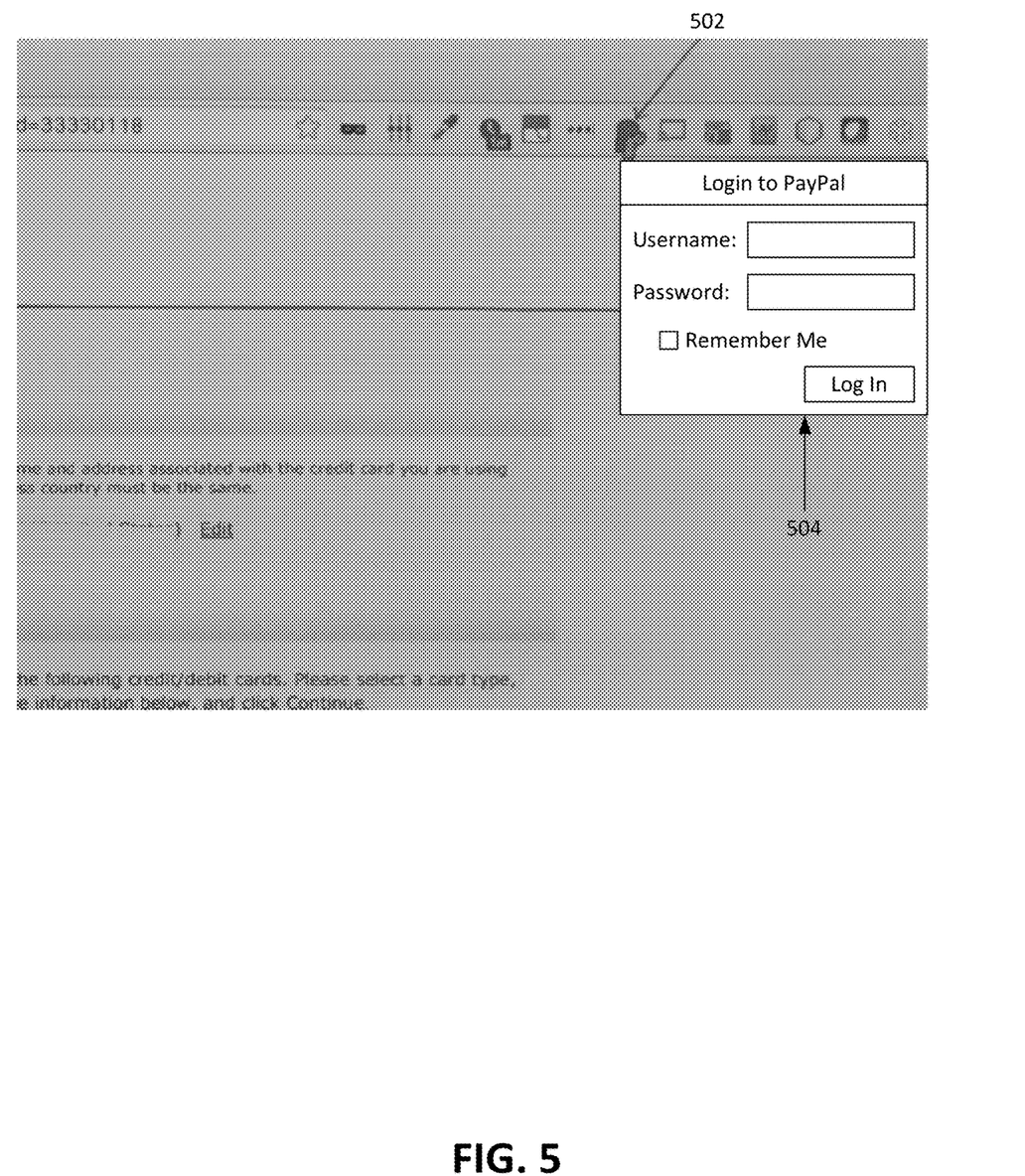
FIG. 5 is an example of a user interface that may generate a request for an on-demand payment instrument according to an embodiment of the disclosure.

FIG. 5 is an example of a user interface that may generate a request for an on-demand payment instrument according to an embodiment of the disclosure. FIG. 5 may show an example web browser that may include an extension, plug-in, and/or add-on for the generation of the on-demand payment instrument. For example, FIG. 5 includes an interface button 502. The interface button 502 may, when the user interacts and/or clicks on the button, generate an on-demand payment instrument request. In embodiments, after interacting with the interface button 502, the user may then be prompted to log into his or her user payment account via, for example, the log-in window 504 (e.g., into a PAYPAL® account). In certain other embodiments, the user may log into his or her payment account before the interface button 502 is displayed or before he or she is able to interact with the interface button 502.

In certain embodiments, the extension, plug-in, and/or add-on may automatically determine the identity of the merchant, the transaction amount, the transaction terms (e.g., the amount of transactions and/or the payment period), the user, the user payment account, and other such information from, for example, the webpage displayed when the interface button 502 is clicked (e.g., through text recognition, through data or metadata embedded within the website, through underlying code, or through other such methods). As such, the information may be automatically determined and included with the request for the on-demand payment application in such embodiments. In other embodiments, such information may be entered by the user or may be communicated from another party such as the merchant or a party associated with the merchant.

After the on-demand payment instrument has been generated, it may be communicated to the transaction device. The transaction device may then associate the user payment account to an on-demand payment instrument and communicate information associated with the on-demand payment instrument to the user device, the merchant, and/or a third party. In certain embodiments, such information may be communicated in the form of a token. Upon receiving the token, user device may, for example, auto-fill the information associated with the on-demand payment instrument and/or communicate such information to the user. The information may be communicated by, for example, a pop-up window, a new webpage, an audio message, an e-mail, an online message, a SMS message, or another such communication technique. The on-demand payment instrument may then be used in a transaction. The transaction may then be authenticated, and payment with the on-demand payment instrument may be accepted or rejected.

Figure 6:
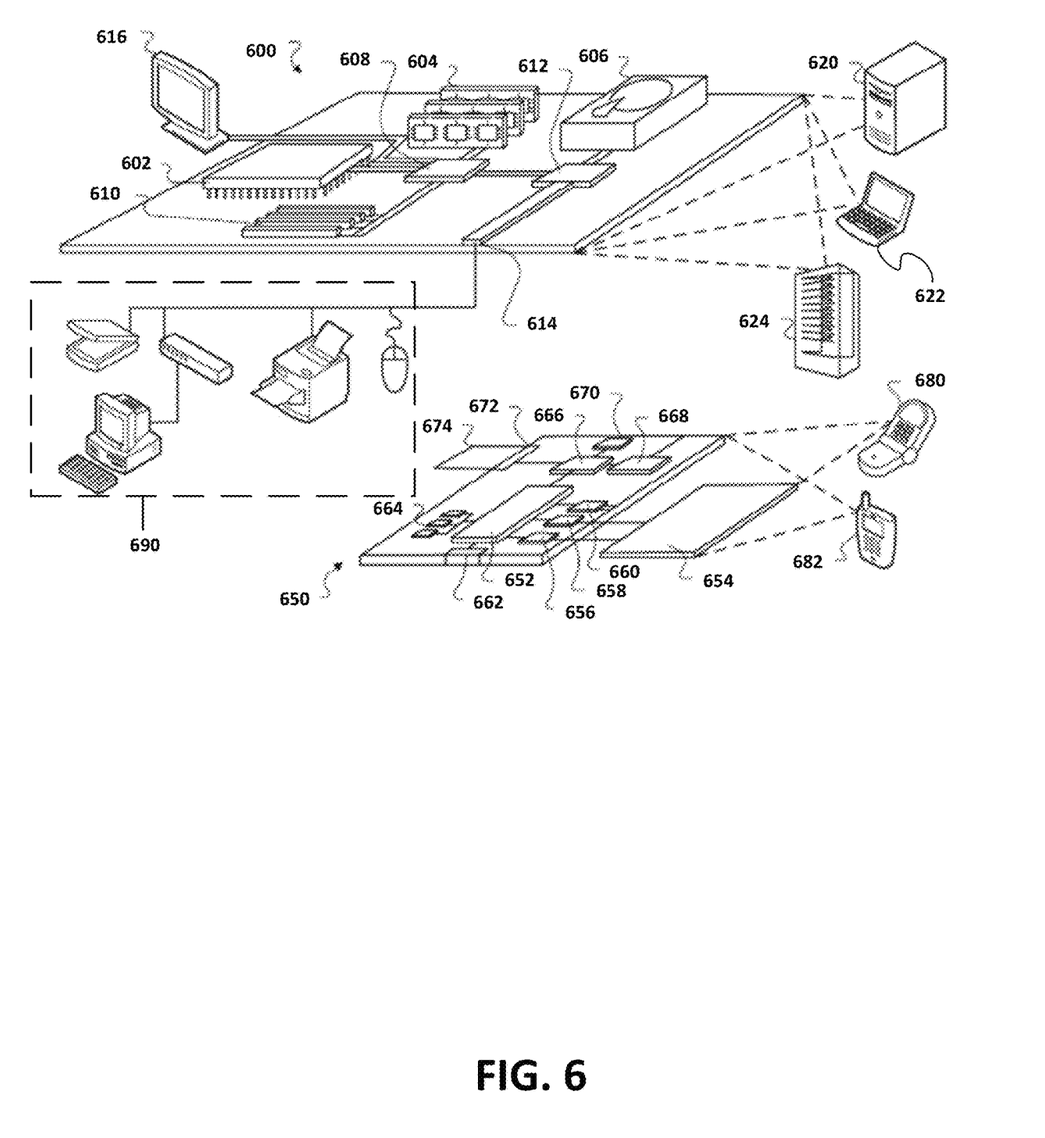
FIG. 6 is a block diagram of an electronic device according to an embodiment of the disclosure.

FIG. 6 is a block diagram of an electronic device according to an embodiment of the disclosure. FIG. 6 shows an example of a computing device 600 and a mobile computing device 650 that can be used to implement the techniques described in this disclosure. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smartphones, wearable devices, and other similar computing devices. The mobile computing device 650 may be used by the user and thus may be referred to as a "user device."

The computing device 600 may include a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Some or all of the processor 602, the memory 604, the storage device 606, the high-speed interface 608, the high-speed expansion ports 610, and the low-speed interface 612, may be interconnected using various busses, may be mounted on a common motherboard, or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 may store information within the computing device 600. In some implementations, the memory 604 may be a volatile memory unit or units. In some implementations, the memory 604 may be a non-volatile memory unit or units. The memory 604 may also be another form of computer-readable medium, such as a magnetic or optical disk.

The storage device 606 may be capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), may perform one or more techniques, such as those described above. The instructions may also be stored by one or more storage devices such as computer- or machine-readable mediums (for example, the memory 604, the storage device 606, or memory on the processor 602).

The high-speed interface 608 may manage bandwidth-intensive operations for the computing device 600, while the low-speed interface 612 may manage lower bandwidth-intensive operations. Such allocation of functions is an example only and other embodiments may allocation functions through other techniques. In some implementations, the high-speed interface 608 may be coupled to the memory 604, to the display 616 (e.g., through a graphics processor or accelerator), and/or to the high-speed expansion ports 610, which may accept various expansion cards (not shown). In the implementation, the low-speed interface 612 may be coupled to the storage device 606 and the low-speed expansion port 614. The low-speed expansion port 614, which may include various communication ports (e.g., USB, BLUETOOTH®, Ethernet, NFC, RFID, wireless Ethernet) may be coupled to one or more input/output devices 690, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 may include a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, may be interconnected using various buses, and several of the components may be mounted on a common motherboard or in other manners as appropriate.

The processor 652 may execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 may store information within the mobile computing device 650. The memory 664 may be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions may be stored in an information carrier. Such instructions, when executed by one or more processing devices (for example, processor 652), may perform one or more processes, such as those described above. The instructions may also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a BLUETOOTH®, Wi-Fi™, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
    a non-transitory memory; and
    one or more hardware processors coupled to the non-transitory memory and configured to read instructions from the non-transitory memory to cause the system to perform operations comprising:
        generating a token based on a token request for the token from a browser extension on a computing device of a user, wherein the token comprises information associated with an on-demand payment instrument, and wherein the on-demand payment instrument is associated with a requested balance that was previously allocated to the on-demand payment instrument for transaction processing from an account of the user;
        loading the token to the computing device via the browser extension;
        receiving a request to process a transaction based on a use of the token with a website, wherein the request includes at least an identity of the user and the information, wherein the information from the token was automatically entered by the browser extension on the computing device interacting with the website for the request;
        determining, via the browser extension based on the request, information of the transaction identified by the browser extension based on the use of the token with the website;

determining on-demand payment instrument information for the on-demand payment instrument based on the information from the token automatically entered for the request;

comparing the information of the transaction to the on-demand payment instrument information to determine whether a match exists between the information of the transaction and the on-demand payment instrument information;

authorizing the transaction in response to the match existing and based on the requested balance; and processing the transaction authorized.

2. The system of claim 1, wherein the on-demand payment instrument information is available for transacting with a merchant not accepting electronic payment methods.

3. The system of claim 1, wherein the comparing the information includes comparing a merchant identity and a transaction amount to the on-demand payment instrument information.

4. The system of claim 1, wherein the operations further comprise:

in response to the receiving, updating the information associated with the on-demand payment instrument based on the use of the token with the website.

5. The system of claim 1, wherein the authorizing includes temporarily associating the on-demand payment instrument with the transaction.

6. The system of claim 5, wherein the temporarily associating includes setting an expiration date on the on-demand payment instrument to match a lifespan of the on-demand payment instrument.

7. The system of claim 1, wherein the authorizing the transaction includes authorizing a recurring transaction for a period of time.

8. The system of claim 1, wherein the token is further associated with a payment amount.

9. A method comprising:

generating, by a transaction management system, a token based on a token request for the token from a browser extension on a computing device of a user, wherein the token comprises information associated with an on-demand payment instrument, and wherein the on-demand payment instrument is associated with a requested balance that was previously allocated to the on-demand payment instrument for transaction processing from an account of the user;

loading, by the transaction management system, the token to the computing device via the browser extension;

receiving, by the transaction management system, a request to process a transaction based on a use of the token with a website, wherein the request includes at least an identity of the user and the information, wherein the information from the token was automatically entered by the browser extension on the computing device interacting with the website for the request;

determining, by the transaction management system via the browser extension based on the request, information of the transaction identified by the browser extension based on the use of the token with the website;

determining on-demand payment instrument information for the on-demand payment instrument based on the information from the token automatically entered for the request user;

comparing, by the transaction management system, the information of the transaction to the on-demand payment instrument information;

authorizing, by the transaction management system, the transaction in response to a match between the information of the transaction and the on-demand payment instrument information after the comparing and based on the requested balance; and processing, by the transaction management system, the transaction authorized.

10. The method of claim 9, wherein the on-demand payment instrument information is available for transacting with a merchant not accepting electronic payment methods.

11. The method of claim 9, wherein the comparing the information includes comparing a merchant identity and a transaction amount to the on-demand payment instrument information.

12. The method of claim 9, further comprising:

in response to the receiving, updating, by the transaction management system, the information associated with the on-demand payment instrument based on the use of the token with the website.

13. The method of claim 9, wherein the authorizing includes temporarily associating the on-demand payment instrument with the transaction.

14. The method of claim 13, wherein the temporarily associating includes setting an expiration date on the on-demand payment instrument to match a lifespan of the on-demand payment instrument.

15. The method of claim 9, wherein the authorizing the transaction includes authorizing a recurring transaction for a period of time.

16. The method of claim 9, wherein the token is further associated with a payment amount.

17. A non-transitory machine-readable medium having stored thereon machine-readable instructions executable to cause a machine to perform operations comprising:

generating a token based on a token request for the token from a browser extension on a computing device of a user, wherein the token comprises information associated with an on-demand payment instrument, and wherein the on-demand payment instrument is associated with a requested balance that was previously allocated to the on-demand payment instrument for transaction processing from an account of the user;

loading the token to the computing device via the browser extension;

receiving a request to process a transaction based on a use of the token with a website, wherein the request includes at least an identity of the user and the information, wherein the information from the token was automatically entered by the browser extension on the computing device interacting with the website for the request;

determining, via the browser extension based on the request, information of the transaction identified by the browser extension based on the use of the token with the website;

determining on-demand payment instrument information for the on-demand payment instrument based on the information from the token automatically entered for the request;

comparing the information of the transaction to the on-demand payment instrument information;

authorizing the transaction in response to a match between the information of the transaction and the on-demand payment instrument information from the comparing and based on the requested balance; and processing the transaction authorized.

18. The non-transitory machine-readable medium of claim 17, wherein the on-demand payment instrument information is available for transacting with a merchant not accepting electronic payment methods.

19. The non-transitory machine-readable medium of claim 17, wherein the comparing the information includes comparing a merchant identity and a transaction amount to the on-demand payment instrument information.

20. The non-transitory machine-readable medium of claim 17,
   wherein the operations further comprise:
   in response to the receiving, updating the information associated with the on-demand payment instrument based on the use of the token with the website.

\* \* \* \* \*